April 29, 1930.   J. A. MAYNARD   1,756,652
PRESSURE, TEMPERATURE, AND VACUUM SAFETY RELIEF VALVE
Filed Nov. 6, 1924
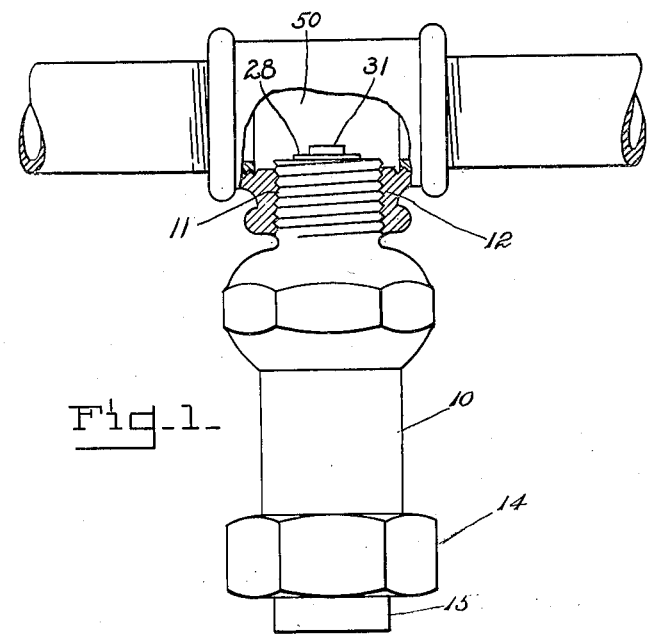
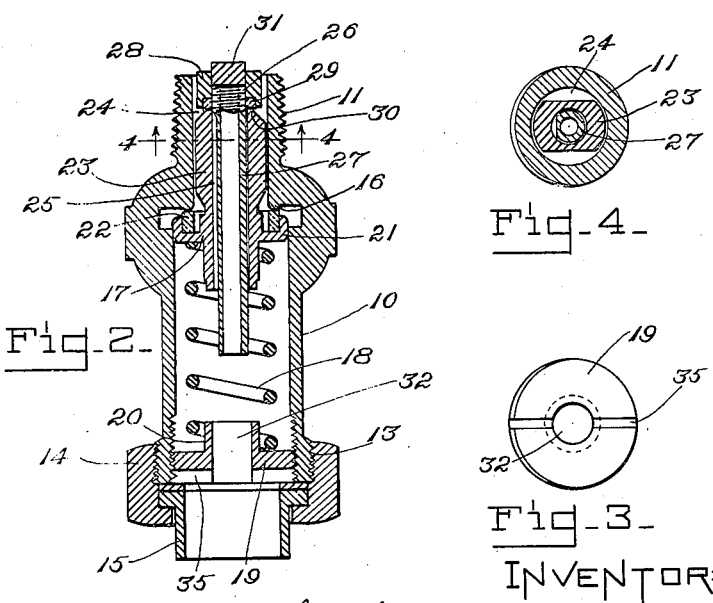
INVENTOR=
Joseph Adolphus Maynard,
by Macleod, Calhn, Copeland & Dike
ATTORNEYS Patented Apr. 29, 1930

1,756,652

UNITED STATES PATENT OFFICE

JOSEPH ADOLPHUS MAYNARD, OF BOSTON, MASSACHUSETTS

PRESSURE, TEMPERATURE, AND VACUUM SAFETY RELIEF VALVE

Application filed November 6, 1924. Serial No. 748,081.

This invention relates to relief devices for fluid containers or water systems, and is particularly adapted for use in connection with hot water boilers intended to furnish hot water for domestic uses, an object of the invention being to provide a relatively simple and compact device having relief features, such as pressure, vacuum and temperature relief, effective to afford protection against excessive temperature, pressure or vacuum in the system.

A further object of the present invention is to provide a unitary device which is not only capable of relieving the boiler or hot water system of excessive or dangerous pressure, but also to protect and relieve the boiler from the danger of crushing due to a partial vacuum as well as to provide relief against pressure which is unduly high.

The invention will be fully understood from the following description when taken in connection with the accompanying drawings, and the novel features thereof will be pointed out and clearly defined in the claims at the close of this specification.

In said drawings:

Fig. 1 is an elevation, partly in section showing my improved device applied to a pipe connection that may connect with a boiler, and Fig. 2 is a central, vertical section through my improved device showing certain parts thereof in elevation.

Fig. 3 is a bottom view of the concealed adjustment plug for the pressure valve.

Fig. 4 is a section taken on the line 4—4, of Fig. 2.

Before explaining in detail the present invention it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

In the drawings there is illustrated a device embodying the present invention, the illustrated construction including, in general, a pressure valve member held to its seat with variable predetermined pressure, this valve member being provided with a valve seat for another valve adapted to control the flow of fluid through the housing or casing in the opposite direction. This second valve is preferably formed as a part of a removable tube, the passage therethrough being controlled by means of a fusible plug which is adapted to fuse or melt when the temperature becomes too high. In its preferred form, therefore, the housing or casing is formed with three separate passages connecting the inlet and outlet, each passage being controlled by a separate relief element, as a result of which a unitary structure is provided which combines in one device the maximum of protection to the user.

A housing is shown at 10 having a threaded nipple 11 at one end to engage with a pipe connection, such as one branch 12 of a T, while the other end of the housing has a threaded nipple 13 to which is fitted a short open pipe 15 secured in place by the union 14. The passage through the housing 10 is reduced at the end adjacent the nipple 11 and where this reduced portion begins, the barrel is rounded off to form the valve seat 16 for the pressure valve 17. This valve is yieldingly pressed to its seat with a predetermined variable pressure by a coil spring 18 resting on the concealed adjustment plug 19. The plug 19 screws into the end of the barrel 10 and receives the end of the coil spring 18 over a tubular extension 20 projecting from one side of the said plug. By adjusting the plug 19, for which purpose the slot 35 is provided, the tension of the spring 18 can be varied so that the point at which the valve 17 will open to relieve excess pressure can be varied and set as required. The union 14 and the short pipe 15 conceal and protect the adjustment plug 19. Danger from improper adjustment of the valve 17 by inexperienced workmen is thus removed. The valve 17 is enlarged below the seat 16 of the casing 10 to provide a circular flange 21 which is cut away to receive a washer 22, which engages the valve seat 16. The neck 23 of the valve 17 extends into the reduced passage 24 of the housing, a limited amount of clearance being allowed between the interior of the nipple 11 and the neck 23. The passage 24 leads into the interior space or chamber 50 of the pipe connection 12 which in turn communicates with the boiler. A central passage 25 extends through the entire length of the pressure valve 17 which passage is controlled by a vacuum valve 26. The vacuum valve 26 is carried by a tubular member 27 which extends through the central passage 25 of the valve 17 and into the interior of the housing 10. The upper end of the tubular member 27 is screwed into a head member 28. A washer 29 in the lower face of the head member 28 rests against the seat 30 on the end of the neck 23 of the pressure valve. The head 28 has a passage therethrough in line with the passage through the tubular member 27. This opening is normally closed by a fusible plug 31 which is made to fuse at a predetermined temperature. This plug extends into the chamber 50 and is exposed to the boiler temperature. When the temperature in the boiler becomes sufficiently high to fuse the plug 31, the passage through the head member 28 and the stem 27 is opened, thereby establishing a free passage through the valve 26 into the housing 10 and through the port 32 in the plug 19 and the opening through the pipe 15.

In operation if the pressure in the system becomes too great the pressure valve 17 will be forced off the seat 16 against the action of the spring 18 while the vacuum valve 26 will open freely as soon as the pressure in the system drops materially below atmospheric pressure, relieving the boiler from the danger of crushing or crumbling because of partial vacuum in the boiler. If the temperature in the system rises above the predetermined point, the fusible plug melts and opens the passage through the valve thus allowing the hot water to pass out and consequently cold water to enter the system.

From the foregoing it will be seen that I have provided a unitary relief device having a spring pressed pressure relief valve 17 for controlling a passage 24 which connects the inlet end of the valve with the outlet, herein shown at the lower end of the device, which is usually connected by a suitable pipe with the drain. Moreover, the device also includes a tube 27 which itself forms another and separate passage connecting inlet and outlet ends of the device, this tube passage being closed at its upper end nearest the boiler by a fusible member or element 31 which in practice is replaceable. The device herein illustrated is ordinarily screwed into a pipe fitting which may have a removable cap (not shown) opposite the end of the tube 27, such as in my application Serial No. 126,881, filed August 3, 1926, whereby in removing the tube it is not necessary to detach the entire valve device. It will be noted however that the tube 27 is further utilized to carry the vacuum valve 26 which in turn controls a third passage 25 connecting inlet and outlet ends of the device. This tube 27, moreover, is mounted in the housing so that it can be removed through the opening at the upper end of the housing without disturbing or necessitating the removal of the pressure valve. Thus the fusible element can be readily and easily replaced without dismantling the parts of the device.

What I claim is:—

1. A combined pressure, temperature and vacuum relief device for hot water systems, such as a hot water boiler, comprising a single housing member provided with a main inlet opening and a main outlet opening, three separate passages in said housing leading from the inlet opening to the outlet opening, a movable valve for closing one passage and adapted to be opened by excess pressure at said inlet, a movable valve for closing another of said passages and adapted to be opened by excess pressure at said outlet, and a member closing the third passage and fusible at a predetermined temperature to open said last named passage.

2. A combined pressure, temperature and vacuum relief device for hot water systems, such as a hot water boiler, comprising a housing provided therein with an inlet chamber and an outlet chamber, separate fluid passages connecting said inlet and outlet chambers, a spring controlled pressure relief valve normally closing a passage and adapted to be opened by excess pressure in the inlet chamber to open such passage from the inlet chamber to the outlet chamber, a vacuum relief valve normally closing another of said passages and adapted to open the same by excess pressure at said outlet chamber, and a temperature relief member normally closing one of said fluid passages and fusible by excess temperature at said inlet chamber.

3. In a relief device for hot water systems, such as for a hot water boiler, a coupling interposed in a water pipe leading to the boiler and having a chamber, a valve connected to the coupling and having a movable pressure relief valve, a vacuum relief valve comprising a valve member and a hollow tube extending freely through said pressure valve and terminating adjacent said chamber, and a fusible plug closing the end of said tube and exposed to the temperature in said chamber.

4. A relief device for hot water systems, such as a hot water boiler, comprising a housing member provided with openings including an inlet and an outlet, a passage in said housing connecting the inlet and the outlet, a movable pressure relief valve for opening and closing said passage between the inlet and the outlet, a removable tube forming a passage therethrough connecting the inlet and the outlet, a fusible relief member normally closing said tube passage, said tube being freely supported in the housing solely by its own weight and removable independently of said pressure relief valve.

5. A relief device for hot water systems, such as a hot water boiler, comprising a housing having an inlet and an outlet, a pressure relief valve, a valve seat carried by said pressure relief valve and having an opening therethrough, a tube extending freely through said opening and having a valve adapted to engage said valve seat, said tube having a passage therethrough, and a fusible member releasable in said tube for closing said passage.

6. A relief device for hot water systems, such as a hot water boiler, comprising a housing having an inlet and an outlet connected by a passage, a valve seat, a removable tube extending through said passage and having an exteriorly formed valve engaging the seat to close said passage, said tube and valve being supported on said seat solely by their own weight, said tube also having a passage therethrough, and a fusible plug normally closing said last passage.

In testimony whereof I affix my signature.

JOSEPH ADOLPHUS MAYNARD.